United States Patent
Berggren et al.

(10) Patent No.: US 7,462,209 B2
(45) Date of Patent: Dec. 9, 2008

(54) REACTOR FOR PERFORMING A STEAM REFORMING REACTION AND A PROCESS TO PREPARE SYNTHESIS GAS

(75) Inventors: Wouter Detlof Berggren, Amsterdam (NL); Franciscus Gerardus Van Dongen, Amsterdam (NL); Thian Hoey Tio, Amsterdam (NL); Pieter Lammert Zuideveld, Amsterdam (NL)

(73) Assignee: Shell Oil Company, Houston, TX (US)

( * ) Notice: Subject to any disclaimer, the term of this patent is extended or adjusted under 35 U.S.C. 154(b) by 526 days.

(21) Appl. No.: 10/552,553

(22) PCT Filed: Apr. 13, 2004

(86) PCT No.: PCT/EP2004/050499

§ 371 (c)(1),
(2), (4) Date: Oct. 12, 2005

(87) PCT Pub. No.: WO2004/092060

PCT Pub. Date: Oct. 28, 2004

(65) Prior Publication Data
US 2006/0191201 A1 Aug. 31, 2006

(30) Foreign Application Priority Data
Apr. 15, 2003 (EP) .................. 03076114

(51) Int. Cl.
 C01B 3/36 (2006.01)
 C01B 3/24 (2006.01)
 C01B 3/26 (2006.01)
 B01J 8/00 (2006.01)
(52) U.S. Cl. .................. 48/197 R; 48/198.1; 48/127.9; 423/651
(58) Field of Classification Search .............. 48/197 R, 48/198.1, 127.9; 423/651
See application file for complete search history.

(56) References Cited

U.S. PATENT DOCUMENTS 4,650,651 A * 3/1987 Fuderer ..................... 422/191

(Continued)

FOREIGN PATENT DOCUMENTS

DE 3345088 6/1985

(Continued)

OTHER PUBLICATIONS

Shell Gasification Process in the Oil and Gas Jrnl., Sep. 6, 1971, pp. 85-90.

(Continued)

Primary Examiner—Walter D Griffin
Assistant Examiner—Lessanework Seifu

(57) ABSTRACT

A reactor vessel for performing a steam reforming reaction having a vessel inlet for natural gas and steam; a vessel inlet for a hot gaseous medium; a vessel outlet for the steam reforming product; and a reactor space which is a bed of steam reforming catalyst, which reactor space inlet is fluidly connected to the inlet for natural gas and steam and at its outlet end fluidly connected with the outlet for the gaseous product; wherein inside the catalyst bed a passageway is provided fluidly connected to the vessel inlet for the hot gaseous medium for passage of hot gaseous mixture counter currently to the flow of reactants in the catalyst bed.

12 Claims, 5 Drawing Sheets

U.S. PATENT DOCUMENTS

| | | |
|---|---|---|
| 4,690,690 A | 9/1987 | Andrew et al. ................ 48/214 |
| 4,943,672 A | 7/1990 | Hamner et al. .............. 585/737 |
| 5,000,926 A | 3/1991 | Murayama et al. .......... 422/197 |
| 5,029,299 A | 7/1991 | Rodgers ..................... 330/298 |
| 5,112,578 A * | 5/1992 | Murayama et al. .......... 422/197 |
| 2004/0241086 A1 * | 12/2004 | Van Dongen et al. ....... 423/651 |

FOREIGN PATENT DOCUMENTS

| | | |
|---|---|---|
| EP | 0168892 | 1/1986 |
| EP | 0291111 | 11/1988 |
| EP | 0668342 | 8/1995 |
| EP | 0695279 | 2/1996 |
| EP | 0776959 | 6/1997 |
| EP | 0983964 | 3/2000 |
| WO | 88/01983 | 3/1988 |
| WO | 93/06041 | 4/1993 |
| WO | 96/03345 | 2/1996 |
| WO | 96/39354 | 12/1996 |
| WO | 97/22547 | 6/1997 |
| WO | 99/20720 | 4/1999 |
| WO | 99/34917 | 7/1999 |
| WO | 01/07538 | 2/2001 |
| WO | 01/34287 | 5/2001 |
| WO | 01/37982 | 5/2001 |
| WO | 02/070627 | 9/2002 |
| WO | 02/070629 | 9/2002 |
| WO | 02/070631 | 9/2002 |

OTHER PUBLICATIONS

Intl Search Report dated Aug. 13, 2004 (PCT/EP2004/050499).
Intl Preliminary Report on Patentability (PCT/EP2004/050499).
Partial oxidation grows stronger in U.S., Oil and Gas Jrnl. Sep. 6, 1971, 69. No. 36.

* cited by examiner

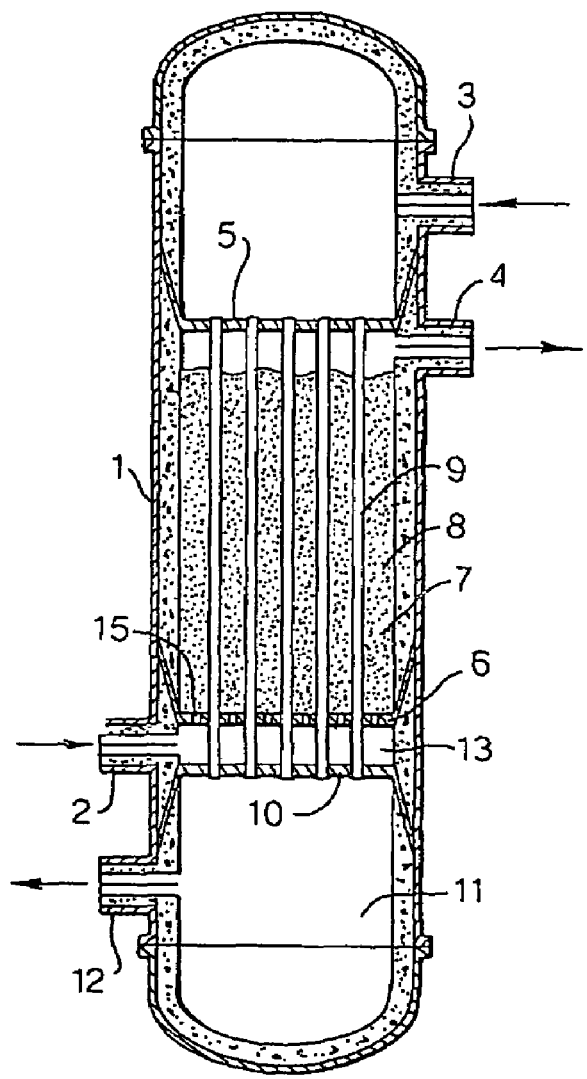
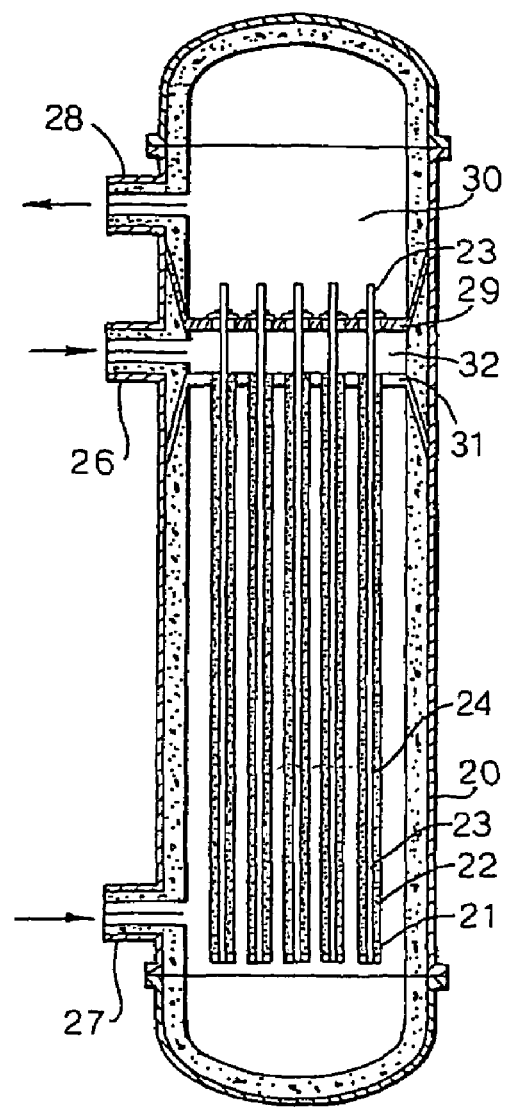
Fig.1.
Fig.2.

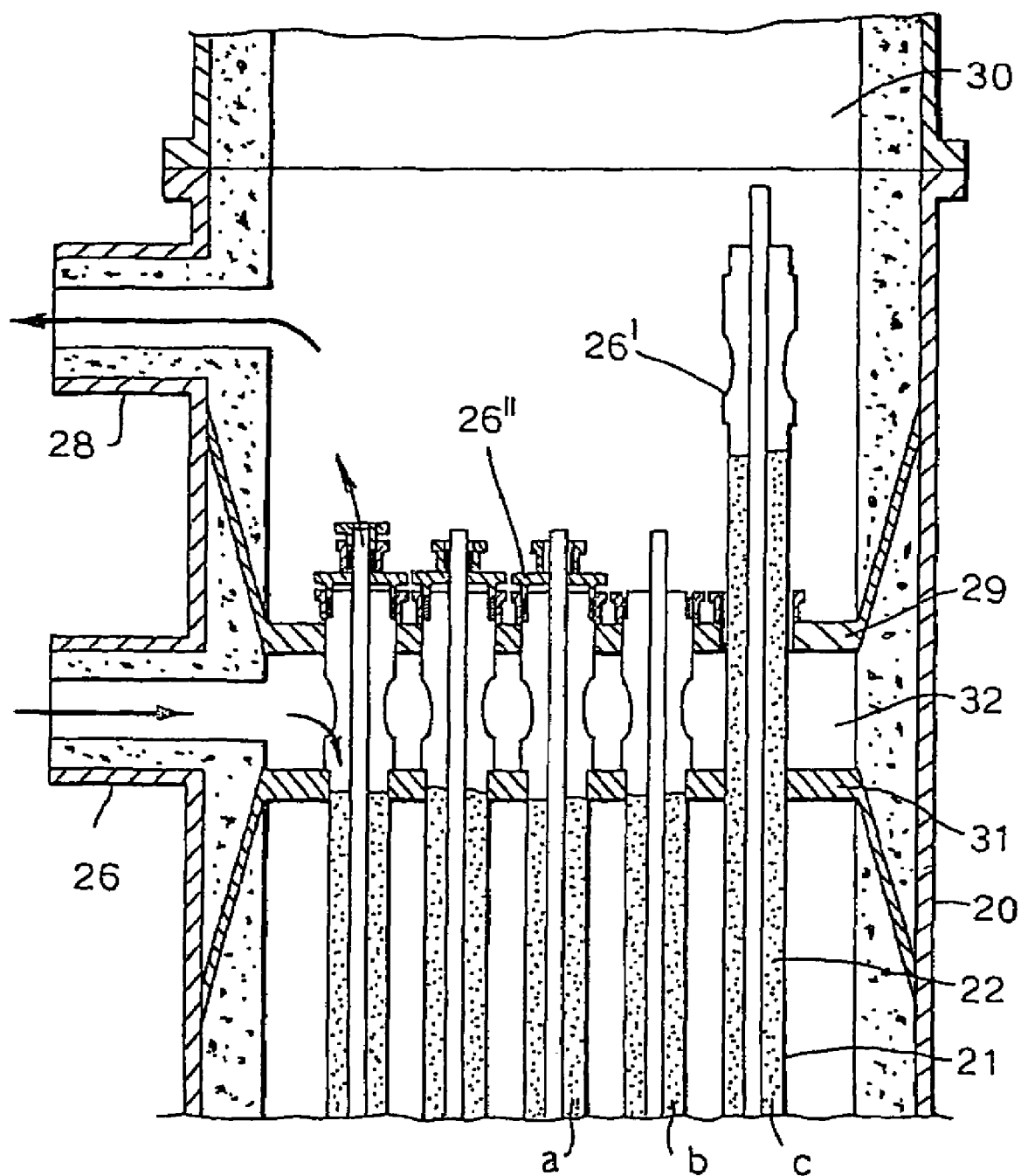

REACTOR FOR PERFORMING A STEAM REFORMING REACTION AND A PROCESS TO PREPARE SYNTHESIS GAS

The present application claims priority on European Patent Application 03076114.2 filed 15 Apr. 2003.

FIELD OF THE INVENTION

The invention is related to a reactor vessel for performing a steam reforming reaction starting from a natural gas feedstock. The invention is also related to a process to prepare a mixture comprising carbon monoxide and hydrogen from a carbonaceous feed by performing a partial oxidation reaction and an endothermic steam reforming reaction.

BACKGROUND OF THE INVENTION

EP-A-168892 describes an endothermic steam reforming reaction, which is carried out in a fixed bed situated in at least one pipe in which a temperature of between 800 and 950° C. is maintained by routing at least part of the hot product gas from a partial oxidation reaction along the pipe(s). According to this publication the combined partial oxidation and endothermic production of synthesis gas result in a better yield of synthesis gas, an increased $H_2/CO$ ratio, a lower usage of oxygen per $m^3$ of synthesis gas product obtained and a lower capital cost of the plant for the production of CO and $H_2$-containing gas mixtures (as compared to partial oxidation).

A reactor and process for performing a steam reforming reaction is described in DE-A-3345088. This publication describes a reactor vessel for performing a steam reforming reaction starting from a natural gas feedstock. The vessel consisted of a tube sheet from which a plurality of tubes filled with a suitable catalyst extended into the vessel. The required heat of reaction is provided by passing the hot effluent of a partial oxidation reaction of natural gas at the exterior of the reactor tubes in the vessel. Such steam reformer reactors are also referred to as so-called convective steam reformer reactors.

A disadvantage of the known reactor vessel design is that fouling may occur at the exterior surface of the reactor tubes. This fouling will result in a less favorable heat exchange between hot gas and the catalyst bed and in time result in a less efficient operation. Short run times will result due to frequent shutdowns in order to remove the deposits. Fouling is especially a problem when the hot effluent of a partial oxidation reaction is used. This effluent is especially suited for providing the required heat due to its high temperatures. However, the soot present in this effluent will cause the above fouling problems.

EP-A-983964 describes a convective steam reforming reactor vessel, wherein the vessel is provided with a plurality of reactor tubes containing a catalyst bed. Around the reactor tubes an annular sleeve is provided to transport a hot effluent of an auto thermal reformer (ATR). By indirect heat exchange between this hot effluent and the reactants passing through the catalyst bed the steam reforming reaction can take place.

WO-A-0137982 discloses a reformer tube of the so-called double-tube configuration of a steam reformer reactor. The double-tube configuration consists of a reactor tube provided with a catalyst bed in which bed an inner return tube is provided for passage of the reactants being discharged from said catalyst bed. The double-tube configuration is described in more detail in U.S. Pat. No. 4,690,690 according to WO-A-0137982. The inner tube as disclosed in WO-A-0137982 has a non-circular cross-section.

WO-A-8801983 discloses a convective steam reforming reactor vessel wherein the hot gas, which is used to heat the reactor tubes, is obtained by burning heating gas in a lower part of the vessel.

It would be useful to provide a reactor design for a convective steam reformer, which is suitable to make use of a hot gaseous medium, which may cause fouling, as for example the effluent of a partial oxidation, as the heating medium. It would also be useful to provide a process for the preparation of a mixture of hydrogen and carbon monoxide by a process involving the combination of partial oxidation and steam reforming wherein the problems regarding fouling as described above are minimized.

SUMMARY OF THE INVENTION

The invention provides a reactor vessel for performing a steam reforming reaction comprising:

a vessel inlet for natural gas and steam, a vessel inlet for a hot gaseous medium, a vessel outlet for a gaseous product comprising the steam reforming product, and a reactor space comprising a bed of steam reforming catalyst, which reactor space inlet is fluidly connected to the inlet for natural gas and steam and at its outlet end fluidly connected with the outlet for the gaseous product, wherein inside the catalyst bed a passageway is provided that is fluidly connected to the vessel inlet for the hot gaseous medium for passage of hot gaseous mixture counter currently to the flow of reactants in the catalyst bed.

The invention further provides a process for the preparation of hydrogen and carbon monoxide containing gas from a carbonaceous feedstock by performing the following steps:

(a) partially oxidizing a carbonaceous feedstock thereby obtaining a first gaseous mixture of hydrogen and carbon monoxide and (b) catalytically steam reforming a carbonaceous feedstock in a Convective Steam Reformer comprising a tubular reactor provided with one or more tubes containing a reforming catalyst, wherein the required heat for the steam reforming reaction is provided by convective heat exchange between the steam reformer reactor tubes and a passageway positioned within and along the axis of the tubular reactor tubes through which passageway the effluent of step (a) flows countercurrent to the gasses in the steam reformer tubes.

BRIEF DESCRIPTION OF THE DRAWINGS

FIG. 1 illustrates an embodiment of the reactor according to the invention wherein the catalyst bed is positioned at the shell side of a reactor vessel.

FIG. 2 illustrates a steam reformer reactor according to the invention wherein the catalyst bed is contained in one or more reactor tubes. FIGS. 2a, 2b and 2c illustrate details and preferred embodiments of the reactor of FIG. 2.

DETAILED DESCRIPTION OF THE INVENTION

Figure 2A:
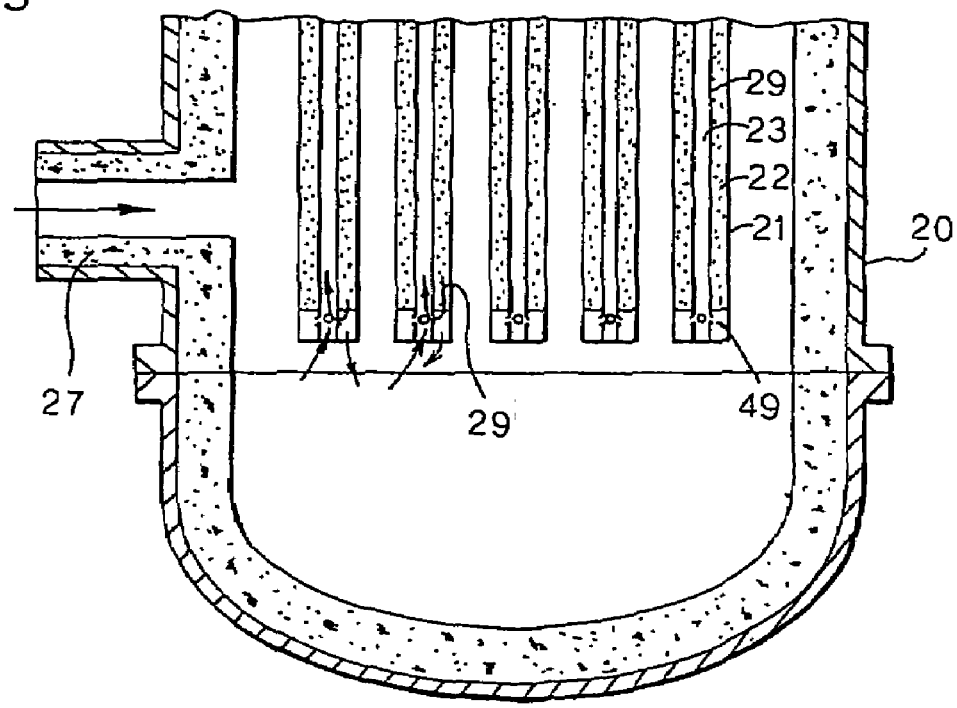

By passing the hot gas medium through an elongated passageway, gas velocity conditions are achieved wherein soot does not adhere to or adheres significantly less to, the heat exchanging surface of the convective steam reformer reactor as compared to the prior art designs. Preferably, the elongated passageway is designed such that the gas will flow with a certain velocity wherein the gas has a self cleaning capacity. The gas velocity at design capacity is preferably above 10 m/s and more preferably above 30 m/s. A maximum gas velocity is preferably below 100 m/s and more preferably below 60 m/s. A further advantage is that if any fouling does occur, such deposits could easily be removed in a shut down by state of the art methods for cleaning the interior of conduits. Examples of cleaning methods are pigging and hydrojetting. Further advantages of the above reactor and of its preferred embodiments will be described below.

FIG. 1 illustrates a reactor vessel (1) for performing a steam reforming reaction according to the present invention. Vessel (1) is provided with a vessel inlet (2) for natural gas and steam, a vessel inlet (3) for a hot gaseous medium and a vessel outlet (4) for the gaseous steam reforming product. Between an upper tube sheet (5) and a lower tube sheet (6) a reactor space (7) comprising of a bed (8) of steam reforming catalyst is present. Inside the catalyst bed (8) a plurality of passageways (9) are provided which start at tube sheet (5) and extend to a tube sheet (10) positioned below lower tube sheet (6). Through these passageways (9) the hot gaseous medium flows counter currently to the flow of reactants in the catalyst bed (8). The space below this tube sheet (10) defines a space (11) through which the cooled gaseous medium is collected and discharged via vessel outlet (12) from the vessel. Between lower tube sheet (6) and tube sheet (10) a space (13) is provided wherein the natural gas and steam can be distributed and fed to the catalyst bed (8) via openings (15) in tube sheet (6).

Preferably, passageways (9) are fixed in the lower tube sheets (6) and are allowed to move relative to tube sheet (5) and (10). This will avoid thermal stress at start-up and shut down operations. The openings may be filled with a flexible seal, for example ceramic fiber, or can be left open as for example illustrated in the aforementioned EP-A-983964. The upper end of the passageways (9) is suitably protected by a heat resistant material, for example a ceramic.

FIG. 2 illustrates a preferred reactor vessel (20) for performing a steam reforming reaction according to the present invention. The reactor space is defined by one or more parallel positioned reactor tubes (21) filled with a bed (22) of steam reforming catalyst. Through this elongated bed of catalyst one or more passageway(s) (23) for hot gas is provided parallel to the axis of the reactor tube (21). This passageway or conduit (23) allows the hot gas medium to exchange its heat by indirect heat exchange through the wall (24) of the conduit (23) with the counter currently flowing gaseous stream present in the catalyst bed (22).

The passageway (23) may have a circular cross-section or a non-circular cross-section such as exemplified in WO-A-0137982. The diameter of a circular passageway (23) is preferably between 10 mm and 60 mm, more preferably between 20 mm and 55 mm. The dimensions of a non-circular passageway (23) will be such that the same cross-sectional area results. The inner distance between the outer wall of passageway (23) and the inner wall of reactor tube (21) is preferably between 20 mm and 150 mm. Preferably this distance is at least six times the size of the catalyst particles which occupy this space.

The fact that the catalyst bed (22) is present in an annular space around the passageway (23) is advantageous because less thermal stress will be exercised on the catalyst bed (22) by the tubes (23) at start-up or cool down situations as would be the case in the reactor of FIG. 1.

FIG. 2 further shows a vessel inlet (26) for natural gas and steam, a vessel inlet for a hot gaseous medium (27) and a vessel outlet (28) for a mixture of the gaseous product comprising the steam reforming product and the hot gaseous medium. FIG. 2 also illustrates a tube sheet (29), defining a space (30), which fluidly connects the vessel outlet (28) with the outlet of the passageways (23) extending from said tube sheet (29). Also, a tube sheet (31) is present below said tube sheet (29), defining a space (32), which fluidly connects the vessel inlet (26) with the inlet of the reactor tubes (21) filled with catalyst bed (22). The reactor tubes (21) will extend from this tube sheet (31) downwards. The passageways (23) will pass this tube sheet up to the upper tube sheet (29) as shown.

In the reactor as shown, part or all of the product gas of the steam reforming reaction is also passed through the elongated passageways. This is advantageous when the hot gaseous mixture is the effluent of a partial oxidation reaction preferably having a steam to carbon ratio of less than 0.5. By combining these streams, the steam to carbon ratio of the resulting mixture flowing in the passageways (23) will be higher, thereby minimizing metal dusting corrosion within the passageways (23).

Preferably, the lower end of the reactor tube (21) is designed such that immediate and intimate mixing of the steam reformer product, which is discharged from the catalyst bed (22), and the hot gaseous medium takes place. FIG. 2a shows such a preferred embodiment wherein tube (21) and passageway (23) extend somewhat further than catalyst bed (22). In this extension, openings (29) are present in wall (24) such that a substantial amount of the gaseous effluent from the catalyst bed (22) can enter the passageway (23) as is indicated with arrow (29') without being first emitted into the lower end of vessel (20).

Figure 2B:
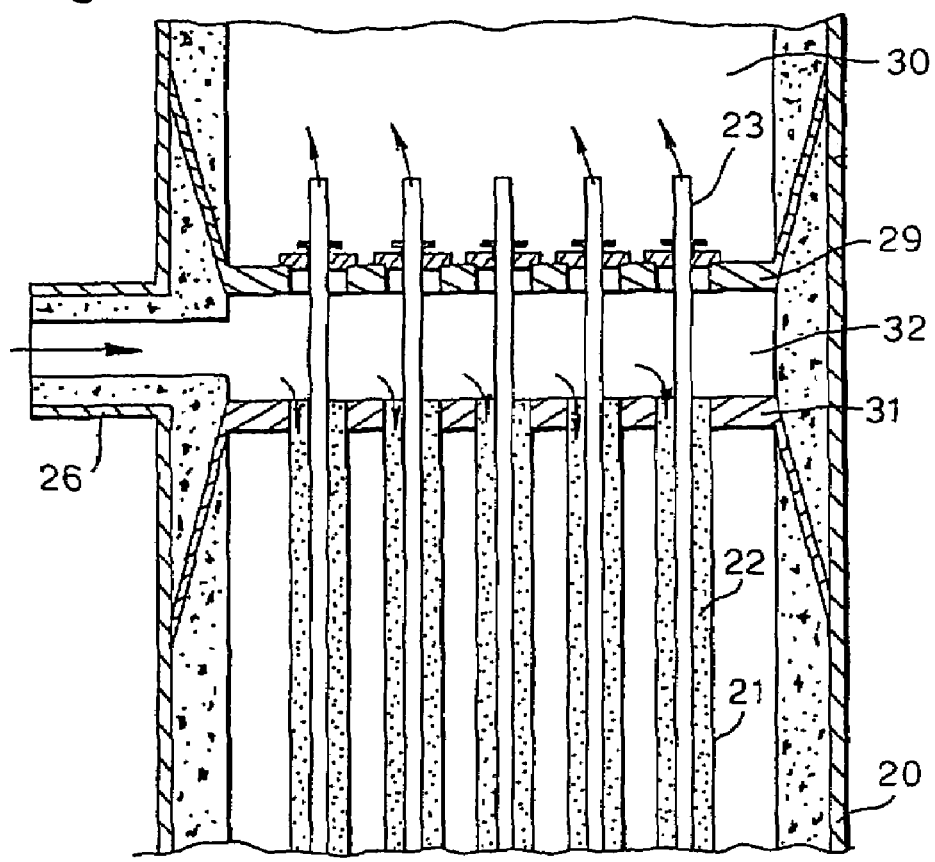

FIG. 2b shows the upper end of vessel (20) of FIG. 2 in more detail. The flow directions of the gasses are shown with arrows. An aspect associated with the design shown in FIG. 2b is catalyst removal. Between tube sheet (29) and tube sheet (31) a small volume is present for operators to remove catalysts from the catalyst bed (22). The design shown in FIG. 2c provides an improvement to this aspect. FIG. 2c shows the same reactor vessel (20) as in FIG. 2 except that the reactor tube (21) extends together with the passageway (23) to the upper tube sheet (29), while the upper level of the catalyst bed (22) extends only to tube sheet (31). In the part of the wall of the reactor tube (21) between tube sheets (31) and (29) an opening (26') is present through which, in use, gas can enter as shown. In use the reactor tube will be fixed in the upper tube sheet (29) by means of cap (26")(situation a). By removing the top of vessel (20) the individual reactor tubes/passageways can be removed from the vessel by removing cap (26") (situation b) and lifting the reactor tube/passageway combination (situation c). Catalyst may then be easily added, removed or refreshed external the reactor vessel (20).

Figure 3:
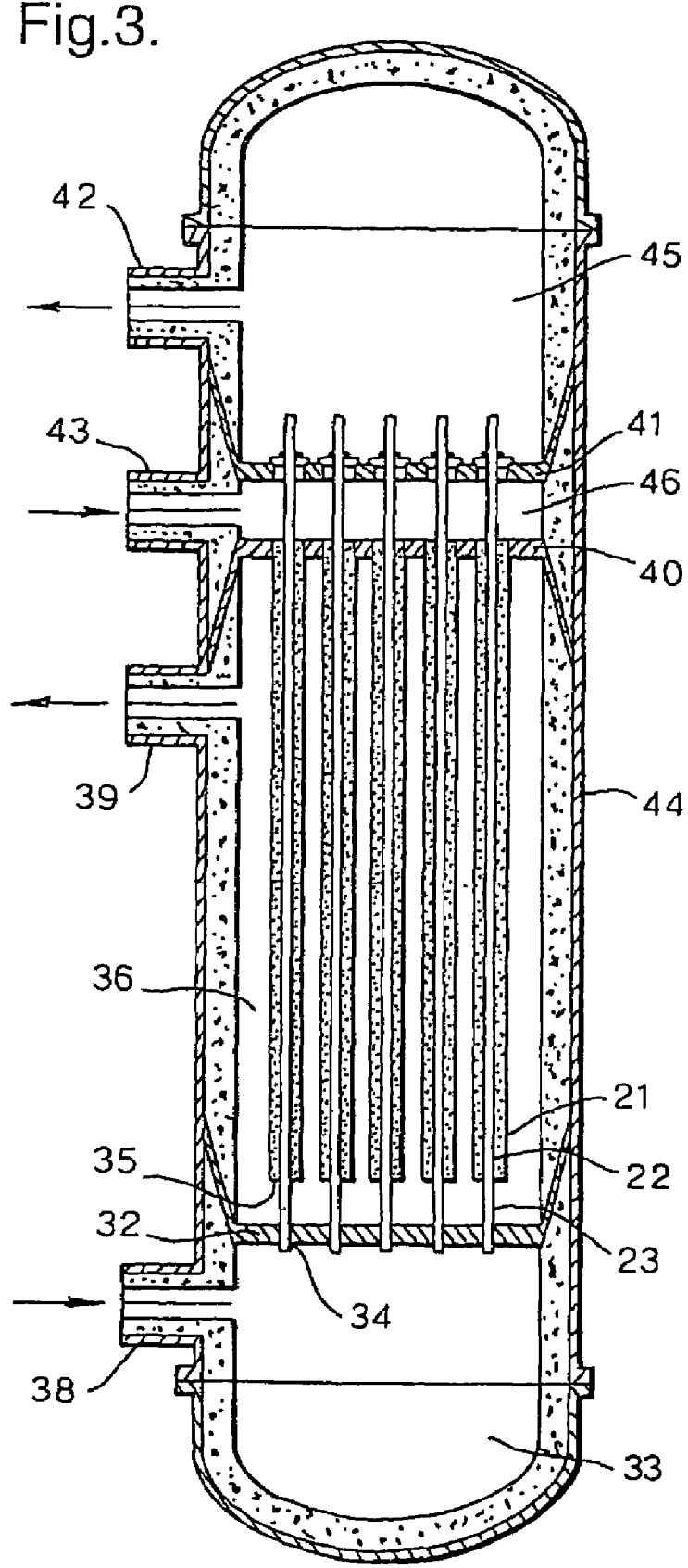
FIG. 3 illustrates a reactor as in FIG. 2 wherein two separate gas outlets are provided.

FIG. 3 illustrates a special embodiment of the reactor vessel as shown in FIG. 2. As in FIG. 2 the reactor space is defined by one or more parallel positioned reactor tubes (21) filled with a bed (22) of steam reforming catalyst, comprising a passageway (23) for hot gas. A difference with the reactor of FIG. 2 is that a third tube sheet (32) is present at the lower end of the reactor vessel (44) defining a space (33) which fluidly connects the vessel inlet (38) for hot gaseous medium with the inlet of the passageways (23) which penetrate the tube sheet

(32) via openings (34) which are preferably larger than the passageway (23) itself. The fact that the passageways are not fixed in the tube sheet (32) is advantageous because it allows the combined reactor tubes (21) and passageways (23) to freely thermally expand in the reactor vessel (44) at start-up and cool down situations. The lower ends of the passageway which extends into the lower space (33) may preferably be made from heat resistant materials like for example ceramics because of the high temperatures present in said space due to the fact that here the hot gaseous medium enters the reactor via vessel inlet (38).

The outlet opening (35) of the reactor tubes (21) comprising the catalyst bed (22) are positioned just above said tube sheet (32). The steam reforming product being discharged from said opening (35) will enter space (36) defined as the space between tube sheets (40) and (32). This space (36) fluidly connects the vessel outlet (39) for the steam reforming product with the openings (35). The space (36) may suitably be provided with flow directing baffles which will direct the flow of steam reforming product in a zig zag flow through said space thereby optimizing the contact of the hot steam reformer product gas and the external surface of the reactor tubes (21) present in said space. In use part of the steam reforming product being discharged from openings (35) will leave the reactor vessel via outlet (39) and part will leave space (36) via openings (34) to space (33) by operating the reactor such that the pressure in space (36) is higher than the pressure in space (33). In use, preferably from 0 wt % to 60 wt % and more preferably from 0 wt % to 40 wt % of the steam reformer product, as being discharged from openings (35), may enter space (33) to be mixed with the hot gaseous medium. This is advantageous because the steam to carbon ratio of the gases flowing in the passageways (23) can be increased thereby limiting metal dusting within the passageways (23).

FIG. 3 further shows a vessel inlet (43) for natural gas and steam, a vessel inlet for a hot gaseous medium (38), a vessel outlet (39) for steam reforming product and a vessel outlet (42) for the gasses, which are emitted from the passageways (23). Tube sheets (40) and (41) are present in order to fix the reactor tubes (21) and to define collecting space (45) for the gasses emitted by the passageways (23) and an inlet space (46) fluidly connecting the vessel inlet (43) for steam and natural gas and the reactor tubes (21) comprising the catalyst bed (22).

As in FIG. 1, the reactor of FIG. 3 yields two product streams. This is advantageous when the hot gaseous medium is the product of a partial oxidation reaction, which has a different hydrogen to carbon monoxide molar ratio than the hydrogen to carbon monoxide molar ratio of the steam reformer product. The two streams may be mixed later on to a specified and desired hydrogen to carbon monoxide ratio. Additionally, hydrogen may be obtained from the stream containing the most hydrogen in a high efficiency. Hydrogen may preferably be separated from such a stream by, for example, membrane separation followed by a pressure swing absorber step. This is advantageous if the synthesis gas mixture and hydrogen gasses are both required in downstream chemical synthesis processes, for example a Fischer-Tropsch process, wherein synthesis gas is required for the Fischer-Tropsch synthesis reaction and hydrogen is needed for the various hydroismerization/hydrocracking and hydrodewaxing units which convert the FT synthesis product to for example middle distillates and base oils.

It will be evident that the reactor as shown in FIGS. 1-3 can also be designed in an inverted fashion and that the variations in tube sheet lay out and corresponding gas inlet and outlet configurations as illustrated are interchangeable between FIGS. 2 and 3.

On the interior wall of the passageways (23), as illustrated in FIGS. 1-3, which are in contact with the effluent of the partial oxidation reaction, carbon may form because part of the carbon monoxide reacts to carbon and carbon dioxide. Metal dusting corrosion may also occur. Furthermore part of the surface may erode, which may eventually result in an unacceptably low mechanical integrity of the passageway tubes. These effects are especially significant when the steam to carbon ratio in the hot gas is below 1, more especially below 0.5. Such gas compositions may occur in the above-described embodiments, especially when the partial oxidation of a gaseous hydrocarbon feed is performed in the absence of added steam and/or when the feed to the steam reforming step has a low steam to carbon ratio.

In order to further minimize the above-described coke formation, a preferred material for the passageway is suitably used. The passageway (23), suitably in the form of a tube, is preferably made from a metal alloy, wherein the metal alloy comprises from 0 wt % and up to 20 wt % and preferably from 0 wt % up to 7 wt % iron. The alloy preferably also contains between 0 wt % and 5 wt % aluminum, preferably from 0 wt % up to 5 wt % silicon, preferably from 20 wt % up to 50 wt % chromium and preferably at least 35 wt % nickel. Preferably, the nickel content balances the total to 100%.

The tubes and extensions of said tubes are preferably one of the following types: wrought tubes, centrifugal cast tubes or sintered metal tubes.

It has been found beneficial to have at least some aluminium and/or silicon in the metal alloy surface when the concentration of steam in the hot gaseous medium within the passageway (23) is lower than 50 vol %, preferably lower than 30 vol % and more preferably lower than 15 vol %. Preferably from 1 wt % up to 5 wt % aluminum and/or from 1 wt % up to 5 wt % silicon is present in said metal alloy under such low steam content conditions. The resulting aluminium oxide and/or silicon oxide layers will provide an improved protection against coke formation and erosion when the conditions become more reducing at such low steam concentrations. Examples of suitable metals are Inconel 693 containing according to its producer Special Metals Corp (USA), typically comprising 60.5 wt % Ni, 29 wt % Cr and 3.1 wt % Al and the Nicrofer 6025H/6025HT alloys 602/602CA as obtainable from Krupp VDM GmbH (DE).

The invention also provides a process for the preparation of hydrogen and carbon monoxide containing gas from a carbonaceous feedstock by performing the following steps:

(a) partially oxidizing a carbonaceous feedstock thereby obtaining a first gaseous mixture of hydrogen and carbon monoxide and (b) catalytically steam reforming a carbonaceous feedstock in a Convective Steam Reformer comprising a tubular reactor provided with one or more tubes containing a reforming catalyst, wherein the required heat for the steam reforming reaction is provided by convective heat exchange between the steam reformer reactor tubes and a passageway positioned within and parallel to the axis of the tubular reactor tube through which passageway the effluent of step (a) flows counter-current to the gasses in the steam reformer tubes.

An advantage of the above process is that due to the fact that the effluent of step (a) is passed through well defined passages through the catalyst bed, less fouling on the heal exchanging surfaces of said passageways will occur. A further advantage is that the hydrogen to carbon monoxide molar ratios of the combined synthesis gas products of step (a) and (b) may be from 1.5 up to 3 and even preferably from 1.9 up to 2.3 making the synthesis gas product suitable for various applications as will be discussed here below.

The carbonaceous feedstock in step (a) is preferably a gaseous hydrocarbon, suitably methane, natural gas, associated gas or a mixture of $C_{1-4}$ hydrocarbons. Examples of gaseous hydrocarbons are natural gas, refinery gas, associated gas or (coal bed) methane and the like. The gaseous hydrocarbon suitably comprises mainly, i.e. more than 90 v/v %, especially more than 94%, $C_{1-4}$ hydrocarbons. It especially comprises at least 60 v/v percent methane, preferably at least 75 percent, more preferably 90 percent Preferably, natural gas or associated gas is used. Preferably any sulfur in the feedstock is removed.

Preferably, the carbonaceous feed in both steps (a) and (b) is a gaseous feed as described above. In such a preferred embodiment from 10 wt % to 90 wt %, more preferably from 20 wt % to 50 wt %, of the total gaseous feed to steps (a) and (b) is fed to step (b).

In step (a) the partial oxidation may be performed according to well known principles as for example described for the Shell Gasification Process in the Oil and Gas Journal, Sep. 6, 1971, pp 85-90. Publications describing examples of partial oxidation processes are EP-A-291111, WO-A-9722547, WO-A-9639354 and WO-A-9603345. In such processes, the feed is contacted with an oxygen containing gas under partial oxidation conditions, preferably in the absence of a catalyst.

The oxygen containing gas may be air (containing about 21 percent of oxygen) and preferably oxygen enriched air, suitably containing up to 100 percent of oxygen, preferably containing at least 60 volume percent oxygen, more preferably at least 80 volume percent, more preferably at least 98 volume percent of oxygen. Oxygen enriched air may be produced via cryogenic techniques, but is preferably produced by a membrane based process, e.g. the process as described in WO 93/06041.

Contacting the feed with the oxygen containing gas in step (a) is preferably performed in a burner placed in a reactor vessel. To adjust the hydrogen to carbon monoxide ratio in the gaseous product obtained in the partial oxidation reaction in step (a), carbon dioxide and/or steam may be introduced into the feed. Preferably, up to 15% volume based on the amount of gaseous product, preferably up to 8% volume, more preferably, up to 4% volume, of either carbon dioxide or steam is added to the feed. As a suitable steam source, water produced in an optional downstream hydrocarbon synthesis may be used.

The gaseous product of the partial oxidation reaction in step (a) preferably has a temperature of between 1100° C. and 1500° C. and a hydrogen to carbon monoxide molar ratio of from 1.5 up to 2.6, preferably from 1.6 up to 2.2.

Step (b) may be performed by well-known steam reforming processes, wherein steam and the gaseous hydrocarbon feed are contacted with a suitable reforming catalyst in a convective steam reformer reactor. The catalyst and process conditions as applied in the steam reformer reactor tubes may be those known by the skilled person in the field of steam reforming. Suitable catalysts comprise nickel optionally applied on a carrier, for example alumina. The space velocity of the gaseous feed is preferably from 700 to 1000 liter (S.T.P.)/liter catalyst/hour, wherein S.T.P. means Standard Temperature of 15° C. and pressure of 1 bar abs. The steam to carbon (as hydrocarbon and carbon monoxide) molar ratio is preferably from 0 up to 2.5 and more preferably below 1 and most preferably from 0.5 up to 0.9. If such low steam to carbon ratios are applied in step (b) the catalyst preferably comprises a Group VIII metal. More preferably, the catalyst comprises (a) an oxidic support material and (b) a coating comprising between about 0.1 wt % and about 7.0 wt % of at least one of the metals of the group consisting of Pt, Ni, Pd and Co, preferably platinum; said support material comprising: (i) at least 80 wt % of $ZrO_2$ which has been calcined at a temperature up to about 670° C. before the application of said coating; (ii) 0.5-10 mol % of at least one oxide selected from the group consisting of Y, La, Al, Ca, Ce and Si, preferably $La_2O_3$. Examples of such catalysts are, for example, the catalyst described in EP-A-695279. Preferably, the feed also comprises an amount of carbon dioxide, wherein preferably the carbon dioxide over carbon (as hydrocarbon and carbon monoxide) molar ratio is from 0.5 up to 2. The product gas of step (b) preferably has a temperature of from 600° C. up to 1000° C. and a hydrogen to carbon monoxide molar ratio of from 0.5 up to 2.5.

The temperature of the hydrogen and carbon monoxide containing gas is preferably reduced in step (b) from a temperature of from 1000° C. up to 1500° C. to a temperature from 300° C. up to 750° C. The temperature of the metal wall surfaces of the passageway in step (b) is preferably maintained below 1100° C.

The mixture of carbon monoxide and hydrogen (steam reformer product) as obtained in step (b) may be directly combined with the product gas as obtained in step (a). This may be achieved within the reactor as exemplified in FIGS. 1 and 3. Alternatively, the product gas as obtained in steps (a) and (b) may be obtained as separate streams and optionally combined in any desired ratio.

In a preferred embodiment, the steam reforming product as obtained in step (b) is fed to step (a). The invention is also directed to encompass below process embodiments wherein a convective steam reactor is used which has separate outlets for the steam reactor product and the cooled effluent of step (a). An advantage of mixing the steam reformer product of step (b) with the feed to step (a) or, more preferably, directly into the reactor of step (a) is that any methane or higher gaseous hydrocarbon, which may still be present in the steam reformer product, is then further converted to hydrogen and carbon monoxide. This is especially advantageous when the steam reforming step (b) is performed on a feed having a steam to carbon ratio of less than 1, especially between 0.5 and 0.9. Operating the process with a lower steam to carbon ratio in the feed to step (b) is advantageous because the resulting synthesis gas product will then also contain less steam and because smaller reactor equipment may be applied. A disadvantage of operating step (b) at a low steam to carbon ratio is that more unconverted methane will be present in the steam reformer product. By routing the steam reformer product to step (a) this disadvantage is overcome.

Optionally the combined streams of step (a) and (b) are subjected to an autothermal reformer step (c) at the elevated temperatures of step (a) in order to convert the gaseous mixture obtained in step (a) to a mixture having a hydrogen to carbon monoxide molar ratio closer to the desired thermal equilibrium hydrogen to carbon monoxide molar ratio values valid for said operating temperatures. The combined mixture, optionally after performing step (c), is passed via the passageways to provide the required reaction heat for performing step (b) to yield the synthesis gas end product.

Figure 4:
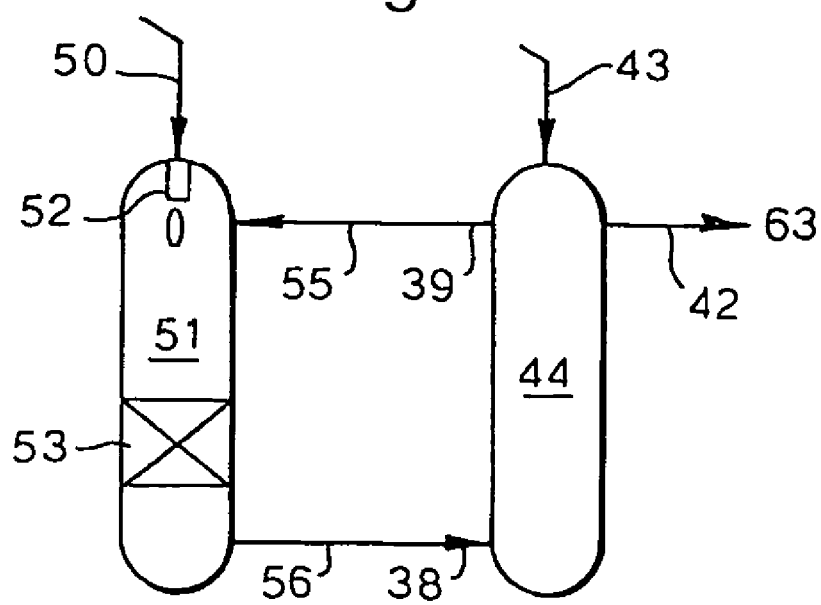
FIG. 4 illustrates the combination of the reactor vessel of FIG. 3 and a partial oxidation reactor vessel.

The above embodiment is illustrated in FIG. 4. FIG. 4 shows the reactor vessel (44) of FIG. 3. For clarity reasons, no internals of vessel (44) are shown in FIG. 4. Also shown is a partial oxidation reactor (51) provided with a burner (52). A carbonaceous feed (50) and an oxygen containing gas (50') is supplied to burner (52). Also shown is that the product gas (55) of step (b) is fed to the upper half of the reactor vessel (51).

Preferably, the steam reformer product (55) is fed close, i.e. in the upper half of vessel (51), to the burner (52) in order to benefit the most of the resultant elevated temperatures of from 800 up to 1050° C. present in that region of the vessel (51) enabling conversion of methane which may be present in product (55). The methane content in steam reformer product (55) may be between 5 mol % and 30 mol % carbon relative to the carbon as hydrocarbon in the feed to step (b), (43). This relatively high methane content results when operating step (b) at relatively lower temperatures and/or at relatively low steam to carbon ratio as described before. Low temperatures in step (b) are suitably between 700° C. and 800° C. as measured on steam reformer product (55) as it leaves the reactor (44). A low temperature is desirable for material strength reasons for the internals used in reactor (44).

Another embodiment which aims at operating step (b) such that the temperature of the reactor (44) internals is kept at acceptable levels is by allowing on the one hand a higher outlet temperature for steam reformer product (55) and on the other hand reducing the temperature of (56). This is achieved by mixing steam reformer product (55) with the gaseous product of the partial oxidation reaction at a position spaced away from the burner (52), such that no significant conversion of methane present in steam reformer product (55) will take place when mixing these two streams. Preferably, mixing is performed in the lower part of reactor vessel (51). Due to mixing of the product of the partial oxidation reaction having a temperature of between 1100° C. and 1500° C. and steam reformer product (55) having a considerable lower temperature a temperature reduction relative to the temperature of the product of the partial oxidation reaction of between 250° C. and 500° C. will result.

Because the outlet temperature of steam reformer product (55) is suitably higher than in the above described embodiment, stream steam reformer product (55) will have a relatively lower methane content, suitably between 1 mol % and 10 mol % carbon and preferably between 2 mol % and 5 mol % carbon relative to the carbon as hydrocarbon in the feed to step (b), (43). This methane is preferably converted in a step (c) in which a temperature reduction is also achieved of suitably between 20° C. and 70° C. and preferably between 40° C. and 60° C. Stream (56) as obtained in step (c) and having a reduced methane content preferably has a temperature of between 950° C. and 1100° C. and more preferably a temperature between 980° C. and 1050° C. The methane conversion in step (c) is suitably between 10 wt % and 50 wt %.

FIG. 4 shows this preferred autothermal reformer step (c), also referred to as catalytic post reforming; when the combined gasses of the partial oxidation reaction and the steam reformer product (55) pass a steam reforming catalyst bed (53) as present in the lower half of reactor vessel (51). The catalyst bed (53) may be any well-known reformer catalyst, for example a Ni-containing catalyst. The effluent of the autothermal reformer step (c) is subsequently fed to inlet (38) of vessel (44), wherein the gasses are cooled in the passageways (23) (not shown in this Figure) and obtained as the final synthesis gas product (63) via outlet (42).

The synthesis gas (63) as obtained by the above process may advantageously be used as feedstock for a Fischer-Tropsch synthesis process, methanol synthesis process, a di-methyl ether synthesis process, an acetic acid synthesis process, ammonia synthesis process or to other processes which use a synthesis gas mixture as feed such as for example processes involving carbonylation and hydroformylation reactions. To steps (a) and (b) preferably recycle gases are fed. These recycle gasses are obtained in, for example, the above exemplified processes which use the synthesis gas as prepared by the process according to the invention. These recycle gasses may comprise $C_{1-5}$ hydrocarbons, preferably $C_{1-4}$ hydrocarbons, more preferably $C_{1-3}$ hydrocarbons. These hydrocarbons, or mixtures thereof, are gaseous at temperatures of 5-30° C. (1 bar), especially at 20° C. (1 bar). Further, oxygenated compounds, e.g. methanol, dimethylether, acetic acid may be present.

The invention is especially directed to the above process for the preparation of hydrogen and carbon monoxide containing gas (synthesis gas), wherein additional steps (d) (e) and (f) are also performed. In step (d) the synthesis gas is catalytically converted using a Fischer-Tropsch catalyst into a hydrocarbons comprising stream. In step (e) the hydrocarbons comprising stream of step (d) is separated into a hydrocarbon product and a gaseous recycle stream Suitably the hydrocarbon product comprises hydrocarbons having 5 or more carbon atoms, preferably having 4 or more carbon atoms and more preferably having 3 or more carbon atoms. The gaseous recycle stream may comprise normally gaseous hydrocarbons produced in the synthesis process, nitrogen, unconverted methane and other feedstock hydrocarbons, unconverted carbon monoxide, carbon dioxide, hydrogen and water.

In step (e) the recycle stream is fed to step (a) and/or (b). Preferably the recycle stream is supplied to the burner of step (a) or directly supplied to the interior of the partial oxidation reactor.

Optionally part or all of the carbon dioxide present in such a recycle stream is separated from said recycle stream before being fed to step (a). Part of the carbon dioxide may suitably be fed to step (a).

Step (d) and (e) may be performed by the well known Fischer-Tropsch processes which are for example the Sasol process and the Shell Middle Distillate Process. Examples of suitable catalysts are based on iron and cobalt. Typical reactor configurations include slurry reactors and tubular reactors. These and other processes are for example described in more detail in EP-A-776959, EP-A-668342, U.S. Pat. Nos. 4,943, 672, 5,059,299, WO-A-9934917 and WO-A-9920720, all of which are herein incorporated by reference.

Figure 5:
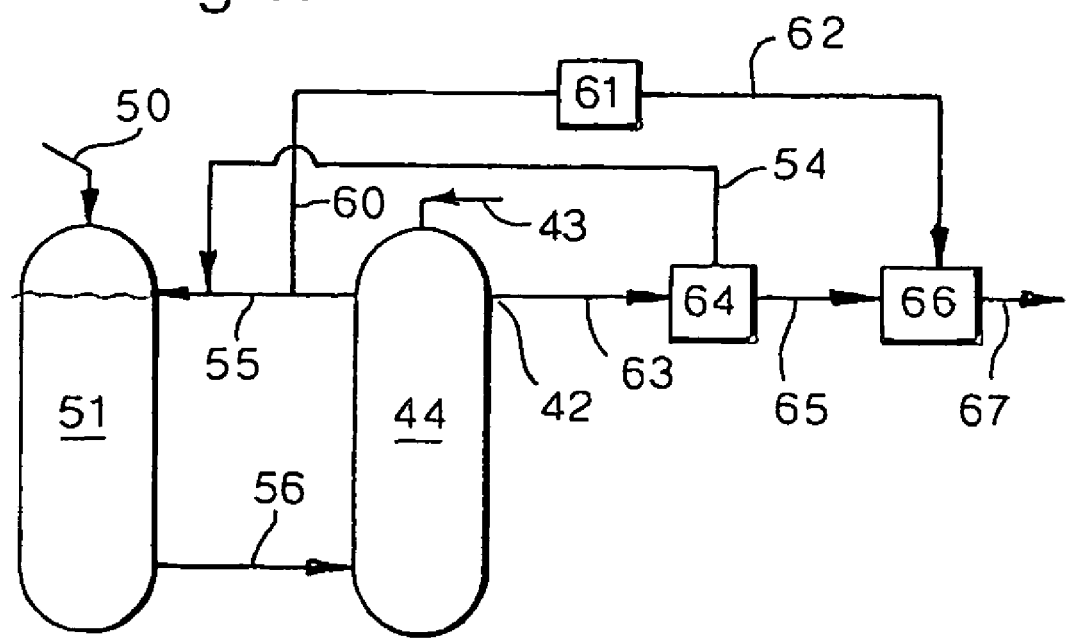
FIG. 5 illustrates an integrated process involving the installation of FIG. 4, a Fischer-Tropsch synthesis and some of its downstream unit operations.

FIG. 5 illustrates the configuration of FIG. 4 in combination with a Fischer-Tropsch synthesis process unit (64) and its downstream hydroconversion unit(s) (66). In addition to FIG. 4, FIG. 5 shows how the synthesis gas (63) is fed to Fischer-Tropsch synthesis process unit (64). In unit (64) a gaseous recycle stream (54) is separated from the hydrocarbon product (65) and recycled to partial oxidation reactor (51).

Also shown is how part (60) of the steam reformer product (55) having a relatively high hydrogen to carbon monoxide molar ratio is fed to a hydrogen recovery unit (61) to obtain hydrogen (62) suitably for use in hydroprocessing unit(s) (66).

The molar hydrogen to carbon monoxide ratio in steam reformer product (55) is higher than 2, preferably higher than 3 and typically not greater than 6. The hydrogen recovery unit (61) may be well known membrane separation units, pressure swing absorbers (PSA) or combinations of a membrane unit and a PSA.

In the hydroprocessing units, the hydrocarbon product present in (65), comprising typically a relatively large portion of compounds boiling above 370° C., is converted by well-known hydrocracking and hydroisomerization processes to middle distillates. Any remaining residue may be further converted to base oils by catalytic dewaxing processes (not shown), which also require hydrogen. Examples of such downstream hydroprocessing units are described in for example WO-A-0107538, WO-02070631, WO-02070629 and WO-02070627, which are herein incorporated by reference, and in the references cited in these publications.

The following examples will illustrate how the reactor according the invention may be used in a process to make a mixture of carbon monoxide and hydrogen. The values presented are calculated values. These will come close to the actual values because use has been made of well known thermodynamic relations known to the skilled person in the field of gasification and steam reforming.

EXAMPLE 1

To a steam reformer reactor according to FIG. 2 natural gas and steam are fed in a steam to carbon ratio of 0.75. Also a hot effluent of a partial oxidation reactor is fed via 27 to said reactor. The mass flows, temperatures and resultant product streams are described in Table 1.

EXAMPLE 2

Example 1 is repeated except that the steam to carbon ratio of the feed to the CSR reactor of FIG. 2 was equal to 1.

EXAMPLE 3

In this example the effluent of the reactor tubes was first fed to the partial oxidation reactor as is illustrated in FIG. 4 (line 55). No catalyst bed 53 was present in the reactor 51.

EXAMPLE 1

Parallel operation - steam to carbon ratio of 0.75

| Stream name Component | Feed to the partial oxidation reactor flow rate | | Feed to the reactor of FIG. 2 via inlet (26). flow rate | | Effluent of the partial oxidation entering the reactor of FIG. 2 via (27) flow rate | | Gas leaving the reactor tubes 21 of the reactor of FIG. 26 flow rate | |
|---|---|---|---|---|---|---|---|---|
| | kmol/h | mol % (dry) | kmol/h | mol % (dry) | kmol/h | mol % (dry) | kmol/h | mol % (dry) |
| Hexane | 0 | 0.00 | 0 | 0.00 | 0 | 0.00 | 0 | 0.00 |
| Pentane | 0 | 0.00 | 0 | 0.00 | 0 | 0.00 | 0 | 0.00 |
| Butane | 44 | 0.11 | 13 | 0.12 | 0 | 0.00 | 0 | 0.00 |
| Propane | 186 | 0.46 | 56 | 0.52 | 0 | 0.00 | 0 | 0.00 |
| Ethane | 1,423 | 3.52 | 427 | 3.94 | 0 | 0.00 | 0 | 0.00 |
| Methane | 21,727 | 53.75 | 6,526 | 60.20 | 822 | 1.19 | 514 | 1.61 |
| Hydrogen | 613 | 1.52 | 184 | 1.70 | 42,624 | 61.63 | 20,786 | 64.91 |
| Carbon Monoxide | 0 | 0.00 | 0 | 0.00 | 23,604 | 34.13 | 7,171 | 22.39 |
| Carbon Dioxide | 267 | 0.66 | 3,368 | 31.06 | 1,149 | 1.66 | 3,285 | 10.26 |
| Nitrogen | 886 | 2.19 | 266 | 2.45 | 886 | 1.28 | 266 | 0.83 |
| Argon | 76 | 0.19 | 0 | 0.00 | 76 | 0.11 | 0 | 0.00 |
| Oxygen | 15,201 | 37.60 | 0 | 0.00 | 0 | 0.00 | 0 | 0.00 |
| Steam | 0 | 0.00 | 24,543 | 0.00 | 5,034 | 0.00 | 17,538 | 0.00 |
| Total | 40,424 | 100.00 | 35,384 | 100.00 | 74,195 | 100.00 | 49,559 | 100.00 |
| Molecular Mass | 22.99 | | 20.32 | | 12.53 | | 14.51 | |
| Temperature (° C.) | 353 | | 420 | | 1,273 | | 1,027 | |
| Pressure (bar) | 71 | | 73 | | 70 | | 70 | |

EXAMPLE 2

Parallel operation - steam to carbon ratio 1.0

| Stream name Component | Feed to the partial oxidation reactor flow rate | | Feed to the reactor of FIG. 2 via inlet (26). flow rate | | Effluent of the partial oxidation entering the reactor of FIG. 2 via (27) flow rate | | Gas leaving the reactor tubes 21 of the reactor of FIG. 26 flow rate | |
|---|---|---|---|---|---|---|---|---|
| | kmol/h | mol % (dry) | kmol/h | mol % (dry) | kmol/h | mol % (dry) | kmol/h | mol % (dry) |
| Hexane | 0 | 0.00 | 0 | 0.00 | 0 | 0.00 | 0 | 0.00 |
| Pentane | 0 | 0.00 | 0 | 0.00 | 0 | 0.00 | 0 | 0.00 |
| Butane | 45 | 0.11 | 12 | 0.11 | 0 | 0.00 | 0 | 0.00 |
| Propane | 191 | 0.46 | 51 | 0.45 | 0 | 0.00 | 0 | 0.00 |
| Ethane | 1,456 | 3.52 | 387 | 3.40 | 0 | 0.00 | 0 | 0.00 |
| Methane | 22,227 | 53.73 | 5,908 | 51.93 | 822 | 1.16 | 200 | 0.63 |
| Hydrogen | 627 | 1.52 | 167 | 1.47 | 43,641 | 61.65 | 19,765 | 62.74 |
| Carbon Monoxide | 0 | 0.00 | 0 | 0.00 | 24,167 | 34.14 | 6,608 | 20.98 |

EXAMPLE 2-continued

Parallel operation - steam to carbon ratio 1.0

| Stream name Component | Feed to the partial oxidation reactor flow rate | | Feed to the reactor of FIG. 2 via inlet (26). flow rate | | Effluent of the partial oxidation entering the reactor of FIG. 2 via (27) flow rate | | Gas leaving the reactor tubes 21 of the reactor of FIG. 26 flow rate | |
|---|---|---|---|---|---|---|---|---|
| | kmol/h | mol % (dry) | kmol/h | mol % (dry) | kmol/h | mol % (dry) | kmol/h | mol % (dry) |
| Carbon Dioxide | 274 | 0.66 | 4,613 | 40.54 | 1,176 | 1.66 | 4,687 | 14.88 |
| Nitrogen | 906 | 2.19 | 241 | 2.12 | 906 | 1.28 | 241 | 0.76 |
| Argon | 78 | 0.19 | 0 | 0.00 | 78 | 0.11 | 0 | 0.00 |
| Oxygen | 15,561 | 37.62 | 0 | 0.00 | 0 | 0.00 | 0 | 0.00 |
| Steam | 0 | 0.00 | 32,573 | 0.00 | 5,151 | 0.00 | 25,816 | 0.00 |
| Total | 41,365 | 100.00 | 43,951 | 100.00 | 75,941 | 100.00 | 57,316 | 100.00 |
| Molecular Mass | 22.99 | | 20.62 | | 12.52 | | 15.81 | |
| Temperature (° C.) | 353 | | 420 | | 1,273 | | 1,027 | |
| Pressure (barg) | 71 | | 73 | | 70 | | 70 | |

EXAMPLE 3

Serial operation - steam to carbon ratio 0.75

| Stream name Component | Feed to the partial oxidation reactor flow rate | | Feed to the reactor 44 of FIG. 4 via inlet 43 flow rate | | Effluent of the partial oxidation entering the reactor 44 of FIG. 4 via 56 flow rate | | Gas leaving the reactor tubes of the reactor 44 via 55 in FIG. 4 flow rate | |
|---|---|---|---|---|---|---|---|---|
| | kmol/h | mol % (dry) | kmol/h | mol % (dry) | kmol/h | mol % (dry) | kmol/h | mol % (dry) |
| Hexane | 0 | 0.00 | 0 | 0.00 | 0 | 0.00 | 0 | 0.00 |
| Pentane | 0 | 0.00 | 0 | 0.00 | 0 | 0.00 | 0 | 0.00 |
| Butane | 38 | 0.10 | 17 | 0.13 | 0 | 0.00 | 0 | 0.00 |
| Propane | 161 | 0.44 | 73 | 0.55 | 0 | 0.00 | 0 | 0.00 |
| Ethane | 1,232 | 3.34 | 554 | 4.23 | 0 | 0.00 | 0 | 0.00 |
| Methane | 18,815 | 51.06 | 8,453 | 64.55 | 313 | 0.31 | 1,114 | 2.86 |
| Hydrogen | 531 | 1.44 | 239 | 1.82 | 63,382 | 63.39 | 25,288 | 65.02 |
| Carbon Monoxide | 0 | 0.00 | 0 | 0.00 | 30,775 | 30.78 | 9,130 | 23.47 |
| Carbon Dioxide | 232 | 0.63 | 3,415 | 26.08 | 4,323 | 4.32 | 3,018 | 7.76 |
| Nitrogen | 767 | 2.08 | 345 | 2.63 | 1,112 | 1.11 | 345 | 0.89 |
| Argon | 75 | 0.20 | 0 | 0.00 | 75 | 0.08 | 0 | 0.00 |
| Oxygen | 14,998 | 40.70 | 0 | 0.00 | 0 | 0.00 | 0 | 0.00 |
| Steam | 0 | 0.00 | 23,727 | 0.00 | 21,597 | 0.00 | 15,393 | 0.00 |
| Total | 36,851 | 100.00 | 36,822 | 100.00 | 121,577 | 100.00 | 54,287 | 100.00 |
| Molecular Mass | 23.44 | | 20.21 | | 13.23 | | 13.71 | |
| Temperature (° C.) | 389 | | 420 | | 1,273 | | 1,027 | |
| Pressure (barg) | 71 | | 73 | | 70 | | 70 | |
| C-atoms | 22,149 | | 13,262 | | 35,411 | | 13,262 | |
| H-atoms | 85,391 | | 85,819 | | 171,210 | | 85,819 | |
| O-atoms | 30,460 | | 30,558 | | 61,018 | | 30,558 | |

The invention claimed is:

1. A process for the preparation of hydrogen and carbon monoxide containing gas from a carbonaceous feedstock said process comprising:

(a) partially oxidizing a carbonaceous feedstock thereby obtaining an effluent comprising a first gaseous mixture of hydrogen and carbon monoxide, and (b) catalytically steam reforming a carbonaceous feedstock to thereby obtain a steam reformer product, which catalytic steam reforming is carried out in a convective steam reformer comprising a tubular reactor provided with a plurality of parallel positioned steam reformer reactor tubes containing a reforming catalyst, and heat for the steam reforming reaction is provided by convective heat exchange between the steam reformer reactor tubes and one or more passageways positioned within and along the axis of the tubular reactor tubes through which passageway the effluent of step (a) flows counter-current to the gasses in the steam reformer tubes.

2. The process of claim 1, wherein the gas velocity in the passageway is between 10 m/s and 60 m/s.

3. The process of claim 1, wherein between 0 wt % and 60 wt % of the steam reformer product as obtained in step (b) and the effluent of step (a) flows through the passageway.

4. The process of claim 1, wherein the hydrogen to carbon monoxide molar ratio of the combined products of step (a) and (b) is between 1.5 and 3.

5. The process of claim 1, wherein the steam to carbon molar ratio of the feed to step (b) is between 0.5 and 0.9.

6. The process of claim 5, wherein the reforming catalyst comprises (a) an oxidic support material and (b) a coating comprising between 0.1 wt % and 7.0 wt % of at least one of the metals selected from the group consisting of Pt, Ni, Pd and Co, said support material comprising: (i) at least 80 wt % of $ZrO_2$ which has been calcined at a temperature up to about 670° C. before the application of said coating; and, (ii) 0.5-10 mol % of at least one oxide selected from the group consisting of oxides of Y, La, Al, Ca, Ce and Si.

7. The process of claim 1, wherein the passageways of step(b) comprise metal wall surfaces and the temperature of the metal wall surfaces is maintained below 1100° C.

8. The process of claim 1, wherein the steam reforming product of step (b) is fed to step (a).

9. The process of claim 8, wherein the steam reforming product of step (b) is fed to the upper half of a partial oxidation reactor vessel having an upper end, said vessel provided with a burner at its upper end, and wherein the temperature in the upper half of the vessel is between 800° C. to 1050° C.

10. The process of claim 8, further comprising:
(c) autothermally reforming a mixture of the steam reformer product of step (b) and the product of the partial oxidation reaction of step (a).

11. The process of claim 1, wherein hydrogen is recovered from the effluent of step (b).

12. The process of claim 1, wherein step (b) is performed in a reactor vessel for performing a steam reforming reaction comprising:
a vessel inlet for natural gas and steam,
a vessel inlet for a hot gaseous medium,
a vessel outlet for a gaseous product comprising the steam reforming product; and
a reactor space having a reactor space inlet and a reactor space outlet end, the reactor space comprising a bed of steam reforming catalyst, the reactor space inlet being fluidly connected to the inlet for natural gas and steam, and at the reactor space outlet end being fluidly connected with the outlet for the gaseous product;
wherein inside the catalyst bed a passageway fluidly connects to the vessel inlet for the hot gaseous medium, the passageway being suitable for passage of hot gaseous mixture counter currently to a flow of reactants in the catalyst bed.

* * * * *